United States Patent Office 3,197,238
Patented July 27, 1965

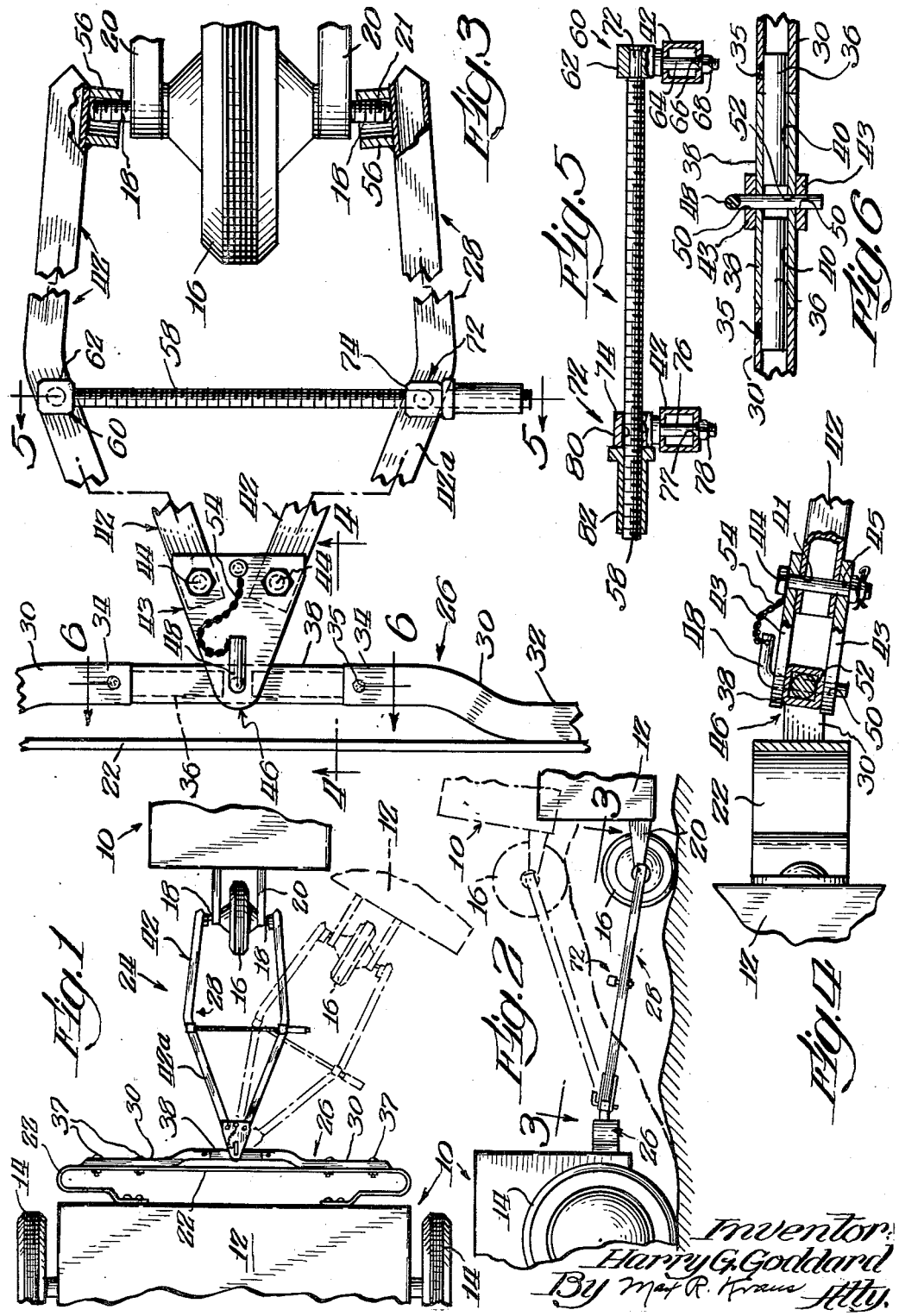
July 27, 1965 H. G. GODDARD 3,197,238
TOW BAR ASSEMBLY
Filed Oct. 5, 1962
Inventor
Harry G. Goddard
By Max R. Kraus Atty.

3,197,238
TOW BAR ASSEMBLY
Harry G. Goddard, 9037 S. Major Ave., Oak Lawn, Ill.
Filed Oct. 5, 1962, Ser. No. 228,646
1 Claim. (Cl. 280—494)

This invention relates to a tow bar assembly.

One of the objects of this invention is to provide a unit which is readily attachable to a pair of vehicles for towing.

Another object of this invention is to provide a unit which is readily attachable to conventional golf cars, particularly of the power driven type, whereby the disabled golf car may be towed.

Power operated golf cars now commonly used frequently become disabled while in use on the golf course. Due to the differences in the various makes of golf cars, it was necessary to use specially made towing equipment and to provide special cars as towing cars. With the present invention this is eliminated, and by a very simple attachment any golf car may be used as the towing car and the towing connecting unit may be readily and easily attached to both the towing car and to the car which is to be towed. The towing connecting unit is adjustable to fit any of the various makes of golf cars. This invention is very simple and inexpensive to manufacture and is readily and easily attachable to the golf cars.

Other objects will become apparent as this description progresses.

In the drawings:

FIG. 1, in full lines, is a top plan view showing the invention connected to the rear of the towing golf car and to the car to be towed. The dotted lines show another position of the connecting unit and the towed car.

FIG. 2, in full lines, is a side elevational view of FIG. 1, and showing in dotted lines the swivelling of the draw bar to permit the towed car to move over hilly ground surfaces.

FIG. 3 is an enlarged top plan view showing this invention, with the parts broken away.

FIG. 4 is a view partly in cross-section taken on lines 4—4 of FIG. 3.

FIG. 5 is a view partly in cross-section taken on lines 5—5 of FIG. 3, and

FIG. 6 is a cross-sectional view taken on lines 6—6 of FIG. 3.

The conventional golf car, which is here indicated at 10, is provided with a body 12 having a pair of rear wheels 14 and a single front steering wheel 16. The front steering wheel 16 is supported on an axle 18 which is secured to spaced arms 20 connected to the car. The ends of the axle 18 are normally externally threaded as at 21 and extend laterally of the arms 20. The golf car is power operated. As best shown in FIGS. 1 and 2, the body 12 has secured to it a rear bumper 22. The foregoing is conventional with golf cars and forms no part of this invention.

The tow bar assembly forming this invention is generally indicated at 24 and includes a draw bar generally indicated at 26 which is attachable to the bumper 22 as a permanent installation, and a connecting unit generally indicated at 28 which is connected at one end to the draw bar 26 and at its other end to the front axle of the towed car.

The draw bar 26 is formed of three sections. The outer two end sections 30 are identical and each is formed preferably of a tube forming a square in cross-section. Each end section is shaped to provide a straight end portion 32 and an inwardly bent offset inner portion 34 which is parallel to the end portion 32. Permanently secured as at 35 to the inside of each of the inner portions 34 of the end sections 30, as best seen in FIG. 6, is an annular rod 36 which extends outwardly of each of the inner portions 34. The central or intermediate section 38 is tubular and is square in cross-section and of the same size and shape as the end sections. The opposite ends of the central section 38 are positioned on the oppositely spaced rods 36 of the end sections, and the central tubular section 38 is rotatable on the spaced rods 36. The tubular section 38 is centrally provided with a pair of alined openings 40.

The three sections of the draw bar 26, just described, are secured in the aforementioned relationship to the rear bumper 22 by means of a plurality of fastening elements 37, which may be threaded bolts extending through openings in the end portions 32 and bumper 22 and secured by nuts, as seen in FIG. 1. The central rotatable section 38 is in a rearward offset position with respect to the opposite end portions 32 to facilitate attachment of the connecting unit 28 thereto.

While the draw bar 26 is shown attached to a bumper, it may be secured directly to the rear of the body of the golf car, or to any other attachment extending from the rear of the golf car. The draw bar 26 when attached remains permanently attached to the car. If all of the golf cars in use on a particular golf course have such draw bars 26 permanently attached, each car may be used as a towing car when necessary, since one end of the connecting unit 28 is readily attachable thereto and the opposite end of the connecting unit is readily attachable to the front axle of the car to be towed.

The connecting unit 28 comprises a pair of bent arms 42, each similarly shaped. The front portion 42a of the arm is bent at an angle with respect to the rear portion 42b. The arms are each made of tubular material forming a square in cross-section, and are each pivotally connected at their forward ends between a pair of spaced triangular-shaped plates 43 by a bolt 44 which extends through suitable alined openings 45 in the plates 43 and alined openings 41 in the arms 42. A suitable nut is attached to each bolt. The two bolts 44 connect the plates 43 and also provide the pivotal connection for each arm, as best seen in FIGS. 3 and 4.

The front end 46 between the spaced plates 43 remains free and is adapted to receive the central section 38 of the draw bar 26, which is secured thereto by a pull out pin 48 which passes through alined openings 50 in the plates 43 and alined openings 52 in the central section 38. The pull out pin 48 is L-shaped and is connected by a small chain 54 to the top plate 43.

The opposite ends of the arms 42 are each provided with a cup-shaped member or socket 56 opening inwardly, each of which engages the opposite ends of the front axle 18, as best seen in FIG. 3. As best seen in plan in FIG. 1, the front portions 42a of the connected arms 42 form a generally V-shaped configuration which extends from approximately midway of the length of the arms to their pivotal connection at the forward end. The rear portions 42b of the arms extend generally parallel to each other. The arms 42 are adjustable with respect to each other for the purpose of accommodating axles of different lengths and also for making a quick attachment of the axle. The adjustment means is best shown in FIGS. 3 and 5.

A threaded rod 58 is permanently secured to one of the arms 42 by a fastening member 60 which has an enlarged head 62 and a threaded shank 64. The shank 64 extends through alined openings 66 in the arm 42 and is secured by a suitable nut 68 so that it may rotate or swivel with respect to the arm 42. The head 62 has a transverse opening 70 in which is permanently secured the end of the rod 58.

Secured to the other arm 42 is a member 72 which is generally similar to fastening member 60. Member 72 has an enlarged head 74 and a threaded shank 76 which extends through alined openings 77 in the arm 42 and is secured by a suitable nut 78 so that it may rotate or swivel with respect to arm 42. The head 74 has a transverse opening 80 extending therethrough which has a diameter larger than the diameter of the rod 58 so that the rod may readily and easily slide through the opening 80. An elongated adjusting nut 82 is secured to the threaded end of the rod 58. Manual rotation of the adjusting nut 82 will cause it to move against the head 74 and thereby move the arm 42 inwardly with respect to the opposite arm 42. Rotation of the adjusting nut 82 in the opposite direction or counterclockwise will move the nut outwardly on the threaded rod and permit the arms 42 to be manually moved outwardly with respect to each other.

Any golf car which has the draw bar 26 attached to it may be used as the towing car. The connecting unit 28 is not at all times attached to the draw bar but is loosely carried so that it may be readily attached at the time it is needed to serve to tow a golf car. In such condition, the arms 42 are adjusted so that the sockets 56 fit on the axle 18, after which the adjusting nut 82 is tightened so that the arm will maintain that position and will not spread apart. The front end 46 is coupled to the draw bar 26, as previously described, and the golf cars are in position so that the front car can tow the disabled second car. The connecting unit 28 can swivel laterally in either direction with respect to the draw bar 26, as shown in dotted lines in FIG. 1, and it may also swivel up or down with respect to the draw bar, due to the rotation of the central section 38, as shown in dotted lines in FIG. 2, to compensate for different elevations of the ground surface.

While the arms 42 shown are bars formed of tubular stock forming a square in cross-section and the sockets 56 are cup shaped, it will be understood that the arms may be made of flat or other shaped bars with openings in their rear ends engageable with the axle, and that the draw bar 26 may have its opposite end sections 30 formed of flat bars, with a central section 38 rotatable relative thereto.

It will be understood that various changes and modifications may be made from the foregoing without departing from the spirit and scope of the appended claim.

What is claimed is:

A tow bar assembly for towing a golf car having an axle with a centrally positioned single steering wheel, said tow bar assembly including a member secured to the rear of the towing car, said member formed of three sections comprising a pair of spaced end sections and a central pivotal section pivotally supported by and between said end sections, said end sections having outer portions adapted to be secured to a towing car and having their inner portions offset so that the central pivotal section is positioned offset and spaced from the plane of securement of the outer portions to the towing car, a connecting unit including a pair of arms, means for pivotally securing said arms at one end, said means being detachably connected to the central pivotal section, said arms being bent so that the front portion of the arm is disposed at an angle with respect to the rear portion of the arm and the pair of arms forming a substantially V-shaped configuration at the front portion of said pair of arms and providing spaced rear portions which incline towards each other, said rear portions each having a cup-shaped member to engage the steering axle of the golf car to be towed, a member extending between said arms and connected to said arms for adjusting the arms relative to each other, said member being pivotally secured to one of said arms and connected to means pivotally secured to the other arm, said member being externally threaded, and a nut on said externally threaded member engaging said last mentioned means for locking said arms against relative movement.

References Cited by the Examiner

UNITED STATES PATENTS

| | | | |
|---|---|---|---|
| 2,287,955 | 6/42 | Zunino | 280—503 X |
| 2,516,067 | 7/50 | Miller | 280—503 |
| 2,600,959 | 6/52 | Bender | 280—498 |
| 2,812,956 | 11/57 | Edinger | 280—491 |
| 2,854,251 | 9/58 | Able et al. | 280—494 X |
| 3,105,706 | 10/63 | Adam | 280—494 X |
| 3,119,631 | 1/64 | Wanamaker | 280—502 X |

A. HARRY LEVY, *Primary Examiner.*

LEO FRIAGLIA, *Examiner.*